(12) United States Patent
Watanabe et al.

(10) Patent No.: US 8,793,311 B2
(45) Date of Patent: Jul. 29, 2014

(54) MULTI CHANNEL, AUTOMATED COMMUNICATION AND RESOURCE SYNCHRONIZATION

(75) Inventors: Timothy Watanabe, San Jose, CA (US); Kenneth Poray, Point Pleasant Beach, NJ (US); Craig So, San Jose, CA (US); Ryan Menda, San Jose, CA (US)

(73) Assignee: Advance Response, LLC., San Jose, CA (US)

( * ) Notice: Subject to any disclaimer, the term of this patent is extended or adjusted under 35 U.S.C. 154(b) by 0 days.

(21) Appl. No.: 12/546,271

(22) Filed: Aug. 24, 2009

(65) Prior Publication Data

US 2011/0047221 A1    Feb. 24, 2011

(51) Int. Cl.
*G06F 15/16*    (2006.01)

(52) U.S. Cl.
USPC ............................ 709/204; 709/249; 379/88.1

(58) Field of Classification Search
USPC ................. 709/201, 204, 205, 249; 379/88.1
See application file for complete search history.

(56) References Cited

U.S. PATENT DOCUMENTS

| | | | |
|---|---|---|---|
| 6,130,933 A | 10/2000 | Miloslavsky | |
| 6,151,354 A * | 11/2000 | Abbey | ........................... 375/211 |
| 6,535,492 B2 | 3/2003 | Shtivelman | |
| 6,687,241 B1 | 2/2004 | Goss | |
| 6,801,520 B2 | 10/2004 | Philonenko | |
| 6,822,945 B2 | 11/2004 | Petrovykh | |
| 6,958,994 B2 | 10/2005 | Zhakov et al. | |
| 7,120,700 B2 | 10/2006 | Macleod Beck et al. | |
| 7,343,010 B2 | 3/2008 | Galvin | |
| 7,373,410 B2 | 5/2008 | Monza et al. | |
| 7,409,054 B2 | 8/2008 | Galvin | |
| 7,457,397 B1 * | 11/2008 | Saylor et al. | ............... 379/88.17 |
| 7,493,269 B2 * | 2/2009 | Fostick et al. | ............... 705/14.26 |
| 7,596,515 B2 * | 9/2009 | Eckel, Jr. | ..................... 705/26.1 |
| 7,660,403 B2 * | 2/2010 | Gomez-Ortigoza | ....... 379/114.2 |

(Continued)

OTHER PUBLICATIONS

U.S. Appl. No. 12/476,017, filed Jun. 1, 2009, Timothy Watanabe.

(Continued)

*Primary Examiner* — David Lazaro
*Assistant Examiner* — Marie Georges Henry
(74) *Attorney, Agent, or Firm* — Kenneth E. Horton; Kirton McConkie

(57) ABSTRACT

Methods and systems that allow multiple channels of communication between multiple users via a platform that automatically integrates and synchronizes the resources of each user during the communication are described. The systems comprise a platform capable of handling multiple types of communications with multiple users and systems. The platform contains a browser, one or more servers for handling communications between the platform and user devices that are external to the platform, a speech engine for converting text to speech and vice versa, a chat server, an email server, a text server, a data warehouse, a scheduler, a workflow/rules engine, a reports server, and integration APIs that can be integrated with $3^{rd}$ party systems and allow those systems to be integrated with the platform. The platform is linked to multiple users (and their devices or systems) through a communications network. Each user can select a preferred communication mode that includes the device, software, and desired communication channel. The platform is able to match the preferred communication mode between multiple users, allowing the users to communicate with each other using their preferred mechanism as well as their preferred communication mode. With such a configuration, the methods for communicating between multiple users are more efficient, effective, and reliable, with increased visibility and accountability between the users. Other embodiments are described.

23 Claims, 9 Drawing Sheets

(56) References Cited

U.S. PATENT DOCUMENTS

| | | | |
|---|---|---|---|
| 2003/0086515 A1* | 5/2003 | Trans et al. | 375/346 |
| 2004/0039846 A1 | 2/2004 | Goss et al. | |
| 2006/0753173 | 2/2006 | Beck et al. | |
| 2007/0274291 A1* | 11/2007 | Diomelli | 370/352 |
| 2008/0052374 A1 | 2/2008 | Powers | |

OTHER PUBLICATIONS

U.S. Appl. No. 12/620,075, filed Nov. 17, 2009, Timothy Watanabe.

* cited by examiner

MULTI CHANNEL, AUTOMATED COMMUNICATION AND RESOURCE SYNCHRONIZATION

FIELD

This application relates generally to methods and systems for communication. In particular, this application relates to methods and systems that allow multiple channels of communication between multiple users or systems via a platform that automatically integrates and synchronizes the resources of each entity used during the communication.

BACKGROUND

Information has traditionally been communicated via methods such as radio, television (TV), telephones, and newspapers. Recently, information has been communicated by more digital mechanisms such as the internet (including web interfaces), email, instant messaging, and social networking services/interfaces (like Facebook, MySpace, Twitter, Yahoo, AIM), and text messaging.

Some of these communication methods have been initiated for the purpose of collecting a payment, to an account holder (i.e., a doctor's office) from the account owner (i.e., a patient). These payment communication methods have typically been performed by mail, phone calls, and in certain instances via email. The communication by phone interaction has usually been limited to 1-to-1 phone calls that are manually initiated by a person. The mail and email have likewise been limited to 1-to-1 communications that are typically initiated by a person. During the last several years, interactive voice applications (IVR) have allowed callers to access information over the phone in an automated or semi-automated fashion.

SUMMARY

This application relates to methods and systems that allow multiple channels of communication between multiple users via a platform that automatically integrates and synchronizes the resources of each user during the communication. The systems comprise a platform capable of handling multiple types of communications with multiple users and systems. The platform contains a browser, one or more servers for handling communications between the platform and user devices that are external to the platform, a speech engine for converting text to speech and vice versa, a chat server, an email server, a text server, a data warehouse, a scheduler, a workflow/rules engine, a reports server, and integration APIs that can be integrated with $3^{rd}$ party systems and allow those systems to be integrated with the platform. The platform is linked to multiple users (and their devices or systems) through a communications network. Each user can select a preferred communication mode that includes the device, software, and desired communication channel. The platform is able to match the preferred communication mode between multiple users, allowing the users to communicate with each other using their preferred mechanism as well as their preferred communication mode. With such a configuration, the methods for communicating between multiple users are more efficient, effective, and reliable, with increased visibility and accountability between the users.

BRIEF DESCRIPTION OF THE DRAWINGS

The following description can be better understood in light of the Figures, in which.

Figure 1:
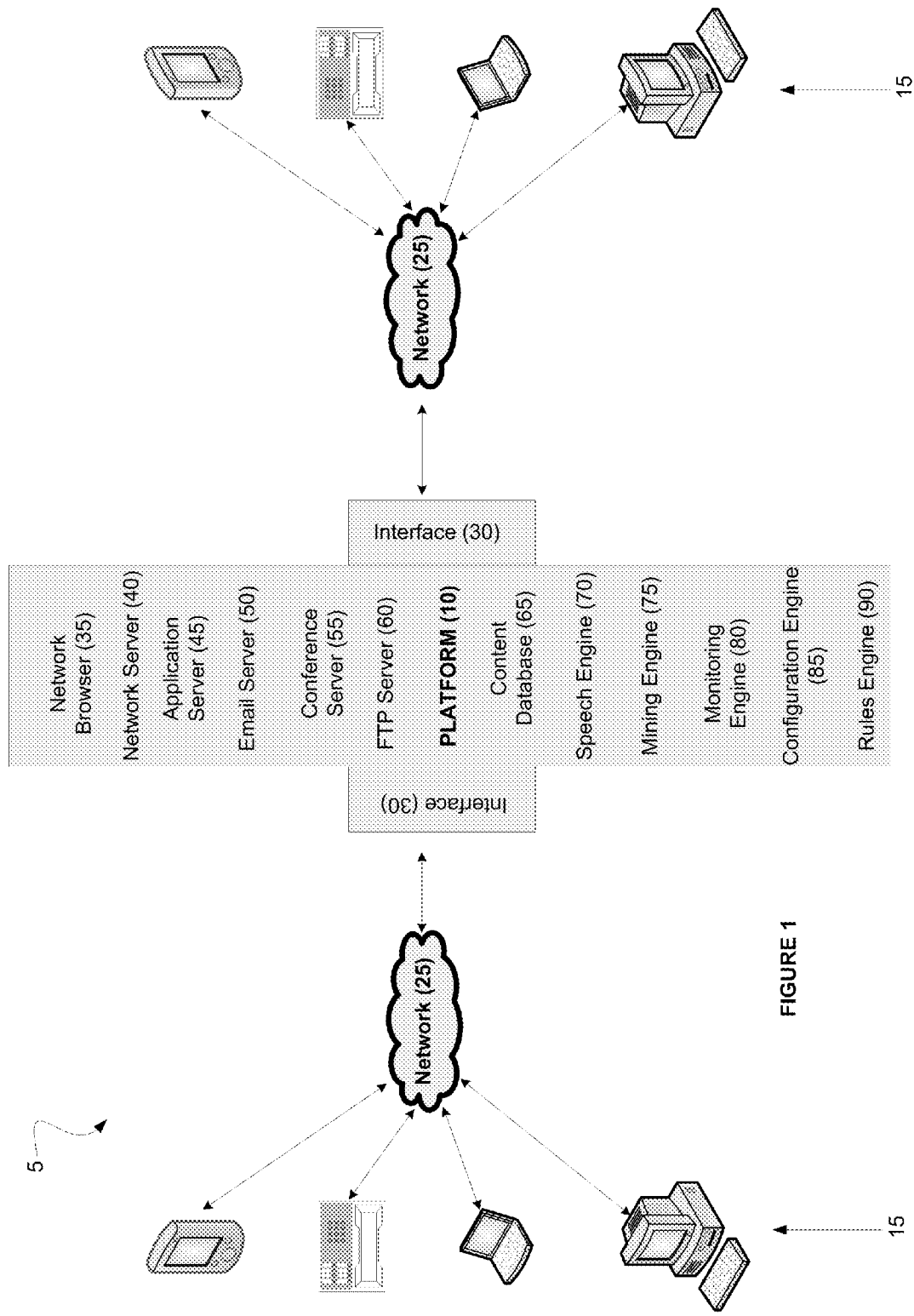
FIG. 1 depicts some embodiments of the communication systems.

The Figures illustrate specific aspects of the methods and systems for communicating. Together with the following description, the Figures demonstrate and explain the principles of the methods and apparatus used by these methods. In the drawings, the thickness of layers and regions are exaggerated for clarity. The same reference numerals in different drawings represent the same element, and thus their descriptions will not be repeated.

DETAILED DESCRIPTION

The following description supplies specific details in order to provide a thorough understanding. Nevertheless, the skilled artisan would understand that the apparatus and associated methods of making and using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry. For example, while the description below focuses on using the communication system for payment transactions, it could be used in and applied to other types of transactions, like insurance, medical, or mortgage servicing transactions.

Some embodiments of the methods and systems for communicating content are shown in FIGS. 1-10. In these embodiments, the system comprises a platform that functions to send and/or receive encrypted or unencrypted data, text, audio, visual, or any other digital information to and/or from multiple users. Any (or all) of the users can use any desired combination of communication mechanisms including static, dynamic, manual, or automated communication mechanisms rather than being restricted to a single communication channel.

In the embodiments shown in FIG. 1, the system 5 comprises a platform 10 that is in communication with various users using any combination of user devices 15 through a communications network 25. Prior to discussing the details of system 5, it should be understood that the following description is presented largely in terms of processes and operations that may be performed by any known computing components. These computing components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 1. The system 5 could equally operate within a computer system having a fewer or greater number of components than those illustrated in the Figures. Thus, the depiction of system 5 should be taken as illustrative and not limiting. For example, the system 5 could implement various services components and peer-to-peer network configurations to implement at least a portion of the processes. The solution can be used in an "on premise" solution, as well as in a software-as-a-service configuration.

Figure 2:
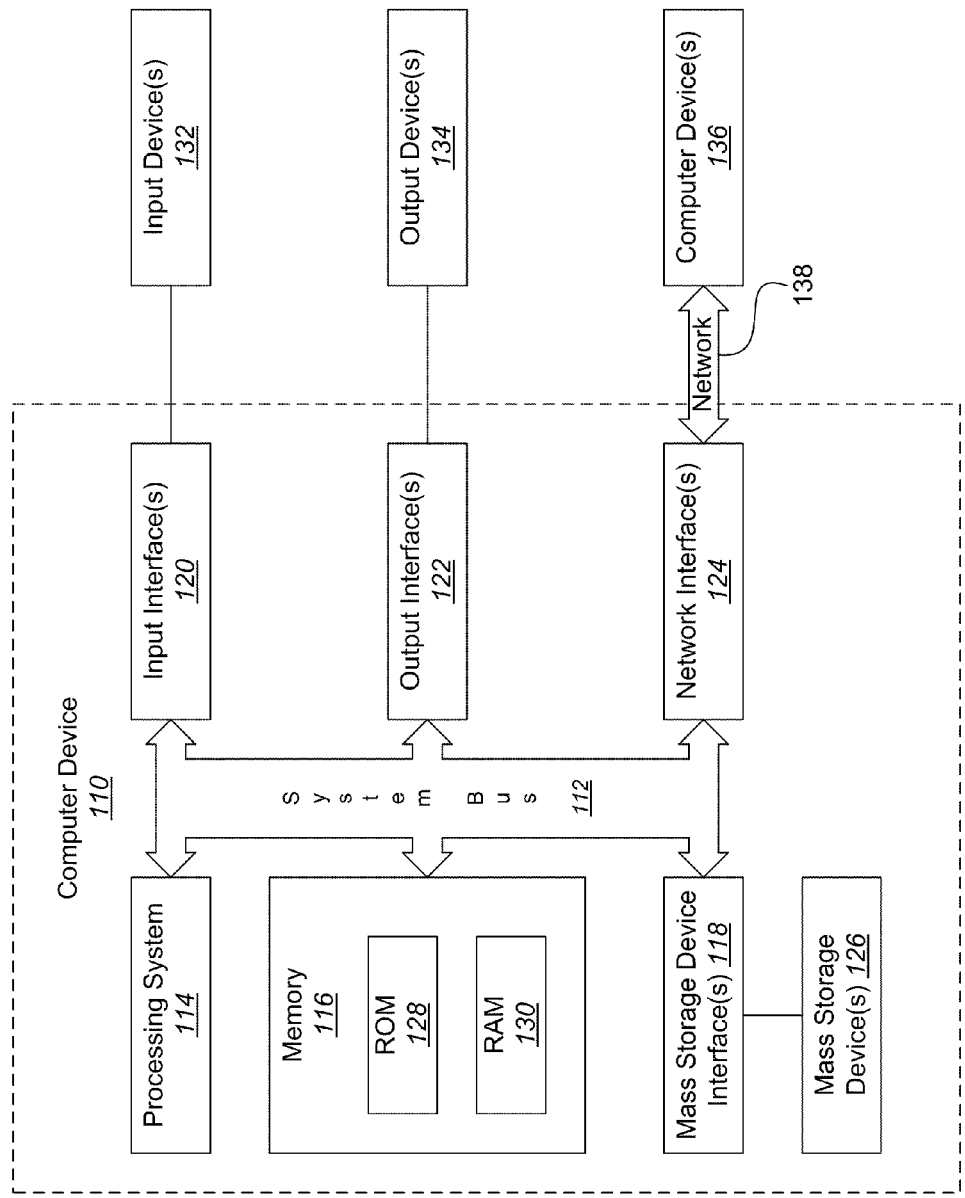
FIG. 2 illustrates an exemplary computer apparatus that can be used in some embodiments in the communication systems.
Figure 3:
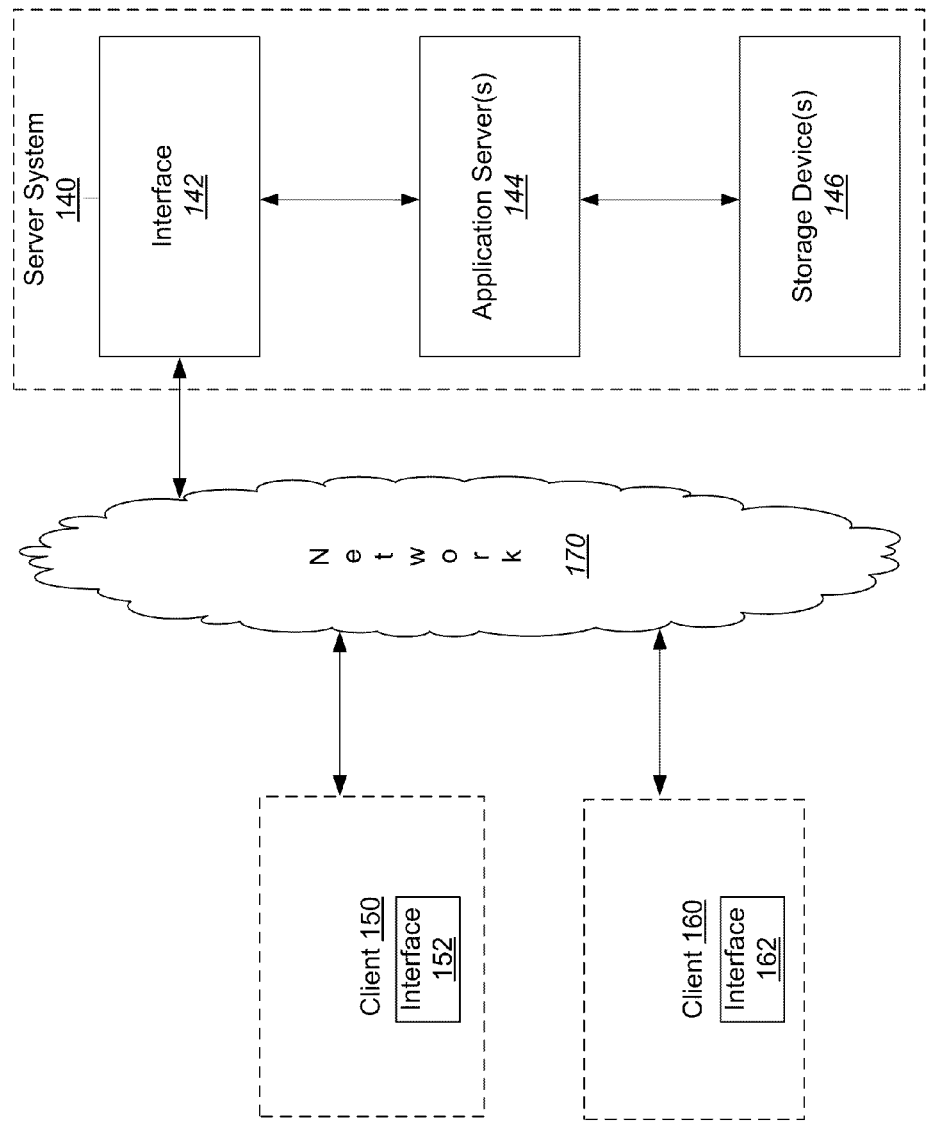
FIG. 3 illustrates an exemplary network that can be used in some embodiments in the communication systems.

In some embodiments, FIGS. 2-3 illustrate one computing environment in which the system may be implemented. These embodiments contain one or more computer readable media that may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 2, the system includes computer device 110, which may be a general-purpose or special-purpose computer. For example, computer device 110 may be a personal computer, a notebook computer, a tablet computer, a personal digital assistant ("PDA"), smart phone, or other hand-held device, a workstation, a minicomputer, a mainframe, a supercomputer, a multi-processor system, a network computer, a processor-based consumer electronic device, or the like.

The computer device 110 includes system bus 112, which may be configured to connect various components thereof and enables data to be exchanged between two or more components. The system bus 112 may include one of a variety of bus structures including a memory bus or memory controller, a peripheral bus, or a local bus that uses any of a variety of bus architectures. Typical components connected by system bus 112 include processing system 114 and memory 116. Other components may include one or more mass storage device interfaces 118, input interfaces 120, output interfaces 122, and/or network interfaces 124.

The processing system 114 includes one or more processors, such as a central processor and optionally one or more other processors designed to perform a particular function or task. It is typically processing system 114 that executes the instructions provided on computer readable media, such as on memory 116, a magnetic hard disk, a removable magnetic disk, a magnetic cassette, an optical disk, or from a communication connection, which may also be viewed as a computer readable medium.

The memory 116 includes one or more computer readable media that may be configured to include or includes thereon data or instructions for manipulating data, and may be accessed by processing system 114 through system bus 112.

The memory 116 may include, for example, ROM 128, used to permanently store information, and/or RAM 130, used to temporarily store information. ROM 128 may include a basic input/output system ("BIOS") having one or more routines that are used to establish communication, such as during start-up of computer device 110. RAM 130 may include one or more program modules, such as one or more operating systems, application programs, and/or program data.

One or more mass storage device interfaces 118 may be used to connect one or more mass storage devices 126 to system bus 112. The mass storage devices 126 may be incorporated into or may be peripheral to computer device 110 and allow computer device 110 to retain large amounts of data. Optionally, one or more of the mass storage devices 126 may be removable from computer device 110. Examples of mass storage devices include hard disk drives, magnetic disk drives, tape drives and optical disk drives. A mass storage device 126 may read from and/or write to a magnetic hard disk, a removable magnetic disk, a magnetic cassette, an optical disk, or another computer readable medium. Mass storage devices 126 and their corresponding computer readable media provide nonvolatile storage of data and/or executable instructions that may include one or more program modules such as an operating system, one or more application programs, other program modules, or program data.

One or more input interfaces 120 may be employed to enable a user to enter data and/or instructions to computer device 110 through one or more corresponding input devices 132. Examples of such input devices include a microphone, a joystick, a game pad, a satellite dish, a scanner, a camcorder, a digital camera, a tactile input device, and the like. Some examples of tactile input devices can include a keyboard and alternate input devices, such as a mouse, trackball, light pen, stylus, touchpad, touch-screen, or any other suitable pointing device. Similarly, examples of input interfaces 120 that may be used to connect the input devices 132 to the system bus 112 include a serial port, a parallel port, a game port, a universal serial bus ("USB"), a firewire (IEEE 1394), or another interface such as data that can be entered via a phone using a voice.

One or more output interfaces 122 may be employed to connect one or more corresponding output devices 134 to system bus 112. Examples of output devices include a speaker, a printer, a visually perceptible output device (e.g., a monitor, display screen, or any other suitable visualization device), and the like. A particular output device 134 may be integrated with or peripheral to computer device 110. Examples of output interfaces include a video adapter, an audio adapter, a parallel port, and the like.

One or more network interfaces 124 enable computer device 110 to exchange information with one or more other local or remote computer devices, illustrated as computer devices 136, via a network 138 that may include hardwired and/or wireless links. Examples of network interfaces include a network adapter for connection to a local area network ("LAN") or a modem, wireless link, or other adapter for connection to a wide area network ("WAN"), such as the Internet, or phone/cellular network for instance 3G. The network interface 124 may be incorporated with or peripheral to computer device 110. In a networked system, accessible program modules or portions thereof may be stored in a remote memory storage device. Furthermore, in a networked system computer device 110 may participate in a distributed computing environment, where functions or tasks are performed by a plurality of networked computer devices.

The system may be operated in networked computing environments with many types of computer system configurations. FIG. 3 represents some embodiments of a networked environment that includes clients 150 and 160 connected to a server system 140 via a network 170. While FIG. 3 illustrates an embodiment that includes two clients connected to the network, alternative embodiments include one client connected to a network or many clients connected to a network. Moreover, some embodiments also include a multitude of clients throughout the world connected to an electronic network, where the network can be a wide area network, such as the Internet.

Returning to FIG. 1, the user devices 15 comprise any communication device known in the art. In some embodiments, the user devices 15 comprises any computing device like a desktop computer, a laptop computer, a server, a telephone, a mobile or cellular phone, a smart phone, a personal digital assistant (such as a Palm Pilot, iPaq, Blackberry device), an automated calling system, any known interactive voice response (IVR) device, an answering machine, a portable electronic device, a mobile hand held device, any electronic device containing computing software or an application programming interface (API), $3^{rd}$ party software (like Lytec, Allscripts, etc), other service providers such as multi-payer solutions like NaviNet, or any combinations thereof. The user's device 15 can communicate using any technology, operating system, or software configuration known in the art.

The communication by the user's device 15 can be made using any technologies known in the art. These technologies include wireless transfers (i.e., Blootooth, Wi-Fi, Wi-Max, cellular phone, etc.), network transfers via any protocol, and bus transfers between devices attached to the same computer processing unit via connectivity such as USB port, FireWire IEEE-1394, serial port, parallel port, PCMCIA, Compact-Flash, SecureDigital, or like ports or means of electronic connectivity.

In other embodiments, the user devices 15 comprise multiple devices or components sufficient to create a system. In these embodiments, the multiple devices/components are combined into creating a computing environment in which the user operates. Examples of user systems include a LAN, WAN, cellular networks, phone lines, internet, intranet, or the like. One particular example of a user system comprises the internal computing network of an insurance company, a hospital, or a doctors' office.

The system 5 is not limited to just communicating with users. In some embodiments, the system 5 can communicate with non-users through their devices and/or systems. Non-user systems and/or devices can contain software including, for example, Lytec, AllScripts, etc. Examples of non-users systems/devices include system software like Lytec and All-Scripts, insurance company data services (sometimes web services or EDI), or IVRs.

The network 25 comprises any electronic communication network known in the art that, in certain configurations, is capable of using the communication employed by the user (or non-user) device(s) (or systems). In some embodiments, the communication network 25 comprises a wide area network, a local area network, a telephone/cellular network, internet services like email, instant messaging, SMS, or combinations thereof.

The types of communication channels in the network 25 can include any of those known in the art. These communication channels include any phone communication (including interactive phone communication through speech or touchtone recognition, IVR, or text-to-speech playback), email, text messaging, SMS, instant messaging (IM), internet communication (such as through a web interface), voice mail, video communication (i.e., video conferencing or Skype conference), system APIs, database calls, or any communication that connects/transfers people or systems to communicate to each other using any type of electronic device or communication mechanism.

The platform 10 can coordinate the sending and/or receiving of data (including any needed digital content) between multiple users using multiple communication channels at the same time. In some configurations, the platform can trigger outbound communications, including interactive calls, chat messages, emails, SMS messages, API integration, etc. These can be coordinated with inbound communications, including interactive calls, chat messages, emails, SMS messages, API integration, etc. that are received by the platform 10. In some embodiments, the outbound communications can automatically retrieve information from any of the users (including individuals via a phone, IVRs, systems, etc.) and make that info available via reports which can include recordings. For instance, the platform could call into an insurance company and get a claims status via an agent or via IVR, can record what was said, and the provider agent could listen to the recording or view the report using the platform whenever desired.

The communication functionality of the platform 10 can include generation of alerts, notifications, reports, user-configurable static or dynamic applications, speech recognition, touchtone recognition, speech-to-text generation, text-to-speech playback, xml, web pages/applications, or any combination thereof that may or may not be integrated together. For example, if a user needs to answer 10 questions and the user answers 7 of them on the phone, when the user logs onto the web, the user can simply answer the remaining 3 without having to start the answering process over from the beginning. The platform 10 comprises any component or combination of components described above that provides any—or all—of these functions. In some configurations, the platform may use a single or multiple functions at a time and those functions can—if desired—interact with each other. In other configurations, all of the functions are capable of working at the same time and interacting with each other. So, for example, if the platform 10 was used to create an application that interacts with a user on a specific topic (i.e., it asks a user "Did you feed the dog?"), that application can be simultaneously used in any or all of the following applications: outbound phone/voip, inbound phone/voip, outbound email/web, inbound email/web, outbound SMS, etc. Thus, if a user receives a voice mail on this topic from the platform, the user can respond to the voice mail via the web or IM or email or whatever communication channel that works best for them.

One of the components that can be contained in the platform 10 includes a network browser 35. This browser can be used to view, organize, analyze, and utilize the information and data in the platform 10. In some configurations, the browser 35 can control the software which a system operator can use to control the operation of the platform 10. In some embodiments, the network browser 35 can comprise an HTML browser, an XML browser, a VXML browser, or combinations thereof.

Another component that can be contained in the platform 10 includes a server. Any type of server known in the art can be used. Examples of servers that can be used include a computer running a UNIX-style operating system, a computer running a Microsoft Windows operating system, Macintosh, or a personal computer workstation. The server can comprise any storage component on which digital information or content can be stored. Examples of storage components include optical storage discs, DVD-RAM discs, and traditional magnetic hard disc drives. In some configurations, the storage component could be a server in a network operations center (NOC).

Another example of a storage component includes any known database (or combination of databases). The database stores any desired information, including information regarding the digital content and any user interaction with the platform. For example, the database stores data regarding any specific user device(s). The database can also store sales information, user information, transactional information, reporting information, data warehousing, etc. As an example of the data warehousing, the platform can store any or all of the desired interactions (for instance, call recordings) as well as the static application used to contact/interact with the user during a transaction. The database may include a Microsoft SQL database, a Microsoft Access database, an Oracle database, a MySQL database or combinations thereof.

In some aspects, multiple servers may be connected together to make a server cluster. Using a server cluster permits sharing information about the data stored on each server and each transaction or event the server has recorded. By using a server cluster, the system 5 is always operational, regardless of the location of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location. In some configurations, there will be server redundancy as well as site redundancy for the servers.

The software components required for operating the server may be included on a single server or on multiple servers, with each server implementing one or more tasks and communicating among themselves using standard networking protocols. Non-limiting examples of the server-focused tasks using the software components that may be implemented on one or more servers including an e-mail server; network server; application server; conference server; ftp server; file server; user device server; speech/voice server; content management server; content synchronization server; chat server, reports server, SMS server; content security server; and advertising/promotional message server.

In some embodiments, such as those depicted in FIG. 1, the platform 10 can contain a network server 40. The network server 40 organizes and manages the data and information coming in from, and out to, the network 25. Thus, the network server can serve to manage all of the communications in the platform 10.

In the embodiments depicted in FIG. 1, the platform 10 can also contain one or more application servers 45. The application server 45 manages the operation of the various software applications and/or paths/workflow that reside on the platform 10.

In the embodiments depicted in FIG. 1, the platform 10 can also contain one or more email servers 50. The email server 50 manages and organizes all of the email related information and data coming into and out of the platform 10 through any email communication method.

In the embodiments depicted in FIG. 1, the platform 10 can also contain a conference server 55. The conference server 55 manages the operation of any conference between an operator of the platform and any user (or combination of users) or any group of users.

In the embodiments depicted in FIG. 1, the platform 10 can also contain an FTP server 60. The ftp server 60 manages and organizes all of the information and data coming into and out of the platform 10 through a file transfer protocol (FTP) communication method.

In some configurations, the platform 10 can also contain a content database 65 that manages and stores digital content or data. The types of digital content that can be stored (and then delivered to a user) are virtually unlimited. Examples of the digital content include music, software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, mp4, oma, m4a, wma, wmv, mov, wav, avi, xml, html, php, pl, jar, exe, alaw, vox, au, pcm8, pcm16, csv, txt, xls, and vxml, as well as combinations thereof. The digital content can also be provided in any known computer or human language. The digital content may be provided internally (by the entity that controls or operates the platform 10), or externally by one or more third parties that may be the copyright owners of the content or that act on behalf of the owners of the content, or even a user (collectively, content providers).

The servers can insert the content or data into any desired communication. For example, the database could insert a text file into a phone call or could insert an audio file into an email, SMS, chat, API, or text message. In some embodiments, the content is inserted into the desired communication based on one or more characteristics that match the communication. For example, text from an excel spreadsheet or other system database/API can be inserted into an outbound call, thereby customizing the information spoken to the user. For example, an outbound call can contain the statement "Hello, this is Dr. Smith's office. [John Doe] has an appointment on [Monday, January 15$^{th}$] at [3:30 pm]." In this case, the various values within the brackets [ ] are taken from an excel spreadsheet and then inserted into the phone/voice application. In some configurations, the content database can contain a rules engine 90 which matches the content with the communication based on these characteristics. For example, if a specific user prefers email when interacting with the platform, when it's time to contact that user, the rules engine will determine that it could send them an email instead of calling them. Thus, the platform contains a way for users to input their personal information as well as preferred communication mechanisms. This personalization can be configured by time, event, or over-ride values.

In some embodiments, the platform 10 also contains a voice platform and/or speech engine 70, as shown in FIG. 1. The speech engine 70 operates both as a speech recognition engine which can automatically convert speech into text, as well as an automated speech generation engine which can automatically convert text into speech. Thus, the speech engine 70 can accepts voice and dtmf (button presses) as input and navigate the voice options accordingly.

The platform 10 can also contain a mining (or reporting) engine 75 as shown in FIG. 1. The mining engine operates to analyze the data present in—or flowing through—the platform 10 from all of the various communications. The analyzed data can then be used for many purposes, including optimizing the operation of the platform 10, customer specific reports, setting rules for the data/information that would trigger an alert or a notification, recipient engagement/progress results, or a combination thereof.

The platform 10 can also contain a monitoring engine 80. The monitoring engine 80 operates to monitor the operation of the various components of the platform 10. The monitoring engine therefore contains API's for data integration and data services (including web services, RSS, email, XML, API, FTP), with integrated triggering services for initiating any outbound communication via phone, job manager, reporting/statistics/logging service, billing and accounting service, multi-tenancy manager, user account (profile) manager which allows for user profiles to be established defining the various ways an individual may be contacted based on preferred device and based on time of day or day of week, resource and configuration manager, and scheduling service manager.

In some embodiments, the monitoring engine 80 allows any information or data associated with any user, and/or that user's activities ("user data") to be securely and appropriately observed by and/or communicated to other parts of the platform, others users, and/or the third parties. User data, among other things, may comprise of information about the user. For instance, user ID, password, and phone number for purposes of connecting various users together. It can also store the user's respective role for things like feature or report accessibility. It can also store preferred contact protocols. For example, for general public users, you can set up a preference such as, if a call is coming in from the CallerID associated with a specific person (MOM), send it to my cell phone. Otherwise, send it to voice mail. Another example is if a call comes in prior to 5 pm, send it to my work phone or have it record a message and send that message to my email. Another example is, if an email is from my boss, call me immediately and read it in text to speech. This can allow users a control protocol to handle their communications. As a further example, a user can have a cell phone that no one knows their number. They can also have a second number that they tell people and have forwarded to their original number. If they are getting too many calls and want to change their publicly known number, they can without changing their real cell phone number. Also, information associated to the operation of any given user device and information related to the entered and/or non-entered activities of users can be monitored. Entered user activities may include, for instance, information the user inputs into the system, i.e., keystrokes, cursor movements, and the like. Additionally, non-entered user activities may include activities such as the user's body movements and expressions that the user does not input, but that can be captured or observed by the user's device.

A monitoring engine 80 may function in any manner that allows either an operator of the system or a third party to perform the desired monitoring. For example, a monitoring engine may gather and relay user data by running continuous built-in tests ("CBIT") and transparently monitoring without disabling a user device or ending software applications. In another example, the monitoring engine may gather information or allow a third party to monitor a user device by taking screen shots, interrogating the system and sub-systems, and receiving information from sensors, the CPU, input and output devices, and/or the like. In yet another example, the monitoring engine can be used to monitor the health of the system, including for CPU utilization, low remaining disk space, low memory, etc. As described herein, this monitoring action can be integrated with other parts of the system to allow administrators real time access to their systems. For example, if a user's computer/server is running low on memory, an alert can be sent to the platform which can then notify an administrator and ask questions like, "Would you like to run a diagnostic test?" If the answer is "yes", the platform can run the test and give the results to the administrator. Upon delivering the results, the platform can ask the administrator what actions could be taken on behalf of the user, i.e., the platform could ask "Would you like me to reboot, fail-over to the backup servers, or do nothing for now?" If the administrator responded with a certain option, the platform could then take the desired action.

The platform 10 can also contain a configuration engine 85 as shown in FIG. 1. The configuration engine allows the operator of the platform to design and develop software application templates, containing an application and a template. The configuration engine contains audit capabilities for storing "static" applications and recipient interactions. For example, with outbound phone call, the configuration engine can use a network of local (relative to the user) phone numbers and/or caller IDs in the communication method. As another example, the configuration engine has the ability for on-hold management which allows a user to be placed on hold until either an agent or the speech engine picks up, or a predefined limit (say 10 minutes) is incurred. Also, it can configure hours of operation for a particular user's agents.

The platform 10 can be connected to the network 25 through an interface 30 that allows the platform to interact with the various user devices and the different communication methods they use. The interface 30 accordingly comprises any known phone interface like Session Initiation Protocol (SIP), Simple Object Access Protocol (SOAP), Skype, and VoIP. The interface also contains an email interface (like Microsoft Exchange or SendMail), an IM interface (like Skype, Yahoo Instant Messenger, Twitter, Jabber), and web interfaces like a "screen pop."

With such components, the platform 10 can be used to receive data (including content) and information from the user device (or system) 15 via sources such as the network server, conference server, ftp server, and/or the email server. As well, the platform 10 can send data and information to the user devices 15 via mechanisms such as the web server, ftp server, network server, the email server, and/or phone. As well, the platform can send or receive data by mechanisms like API Integration and voice mechanisms like phones, VOIP, and answering machines.

Figure 4:
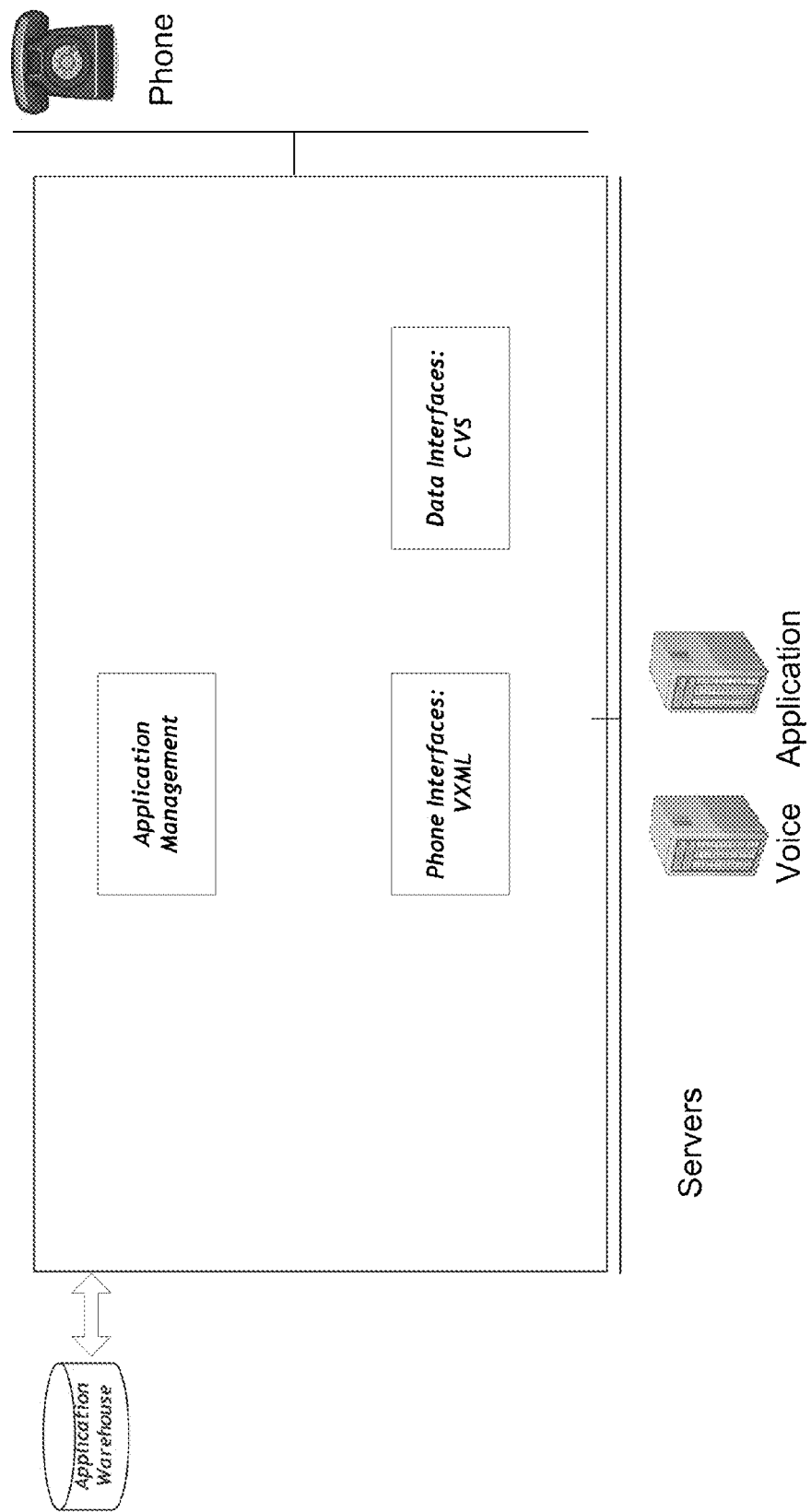
FIG. 4 depicts some embodiments of the communication systems with minimal involvement by a user.
Figure 5:
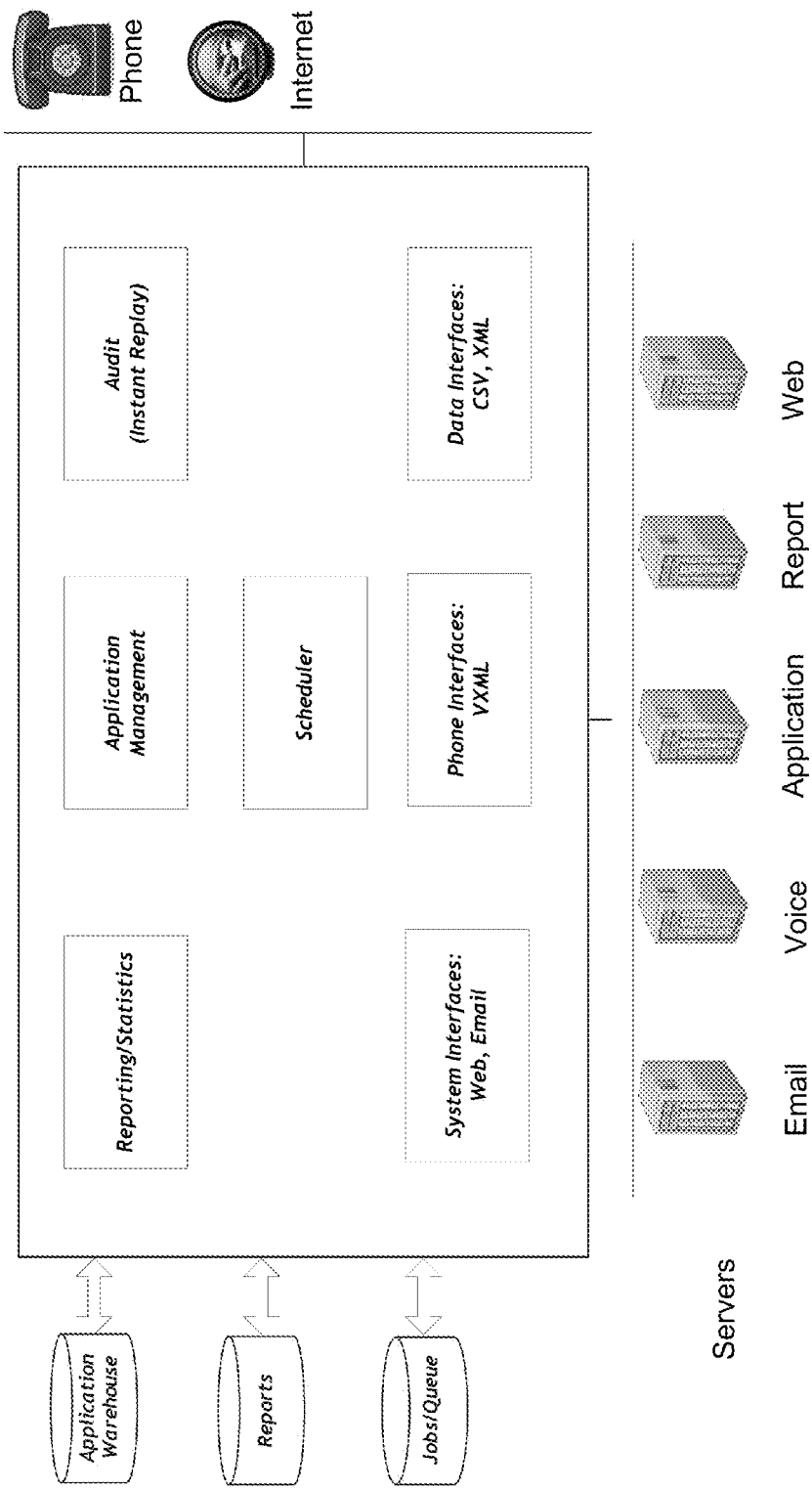
FIG. 5 depicts some embodiments of the communication systems with increased involvement by a user.
Figure 6:
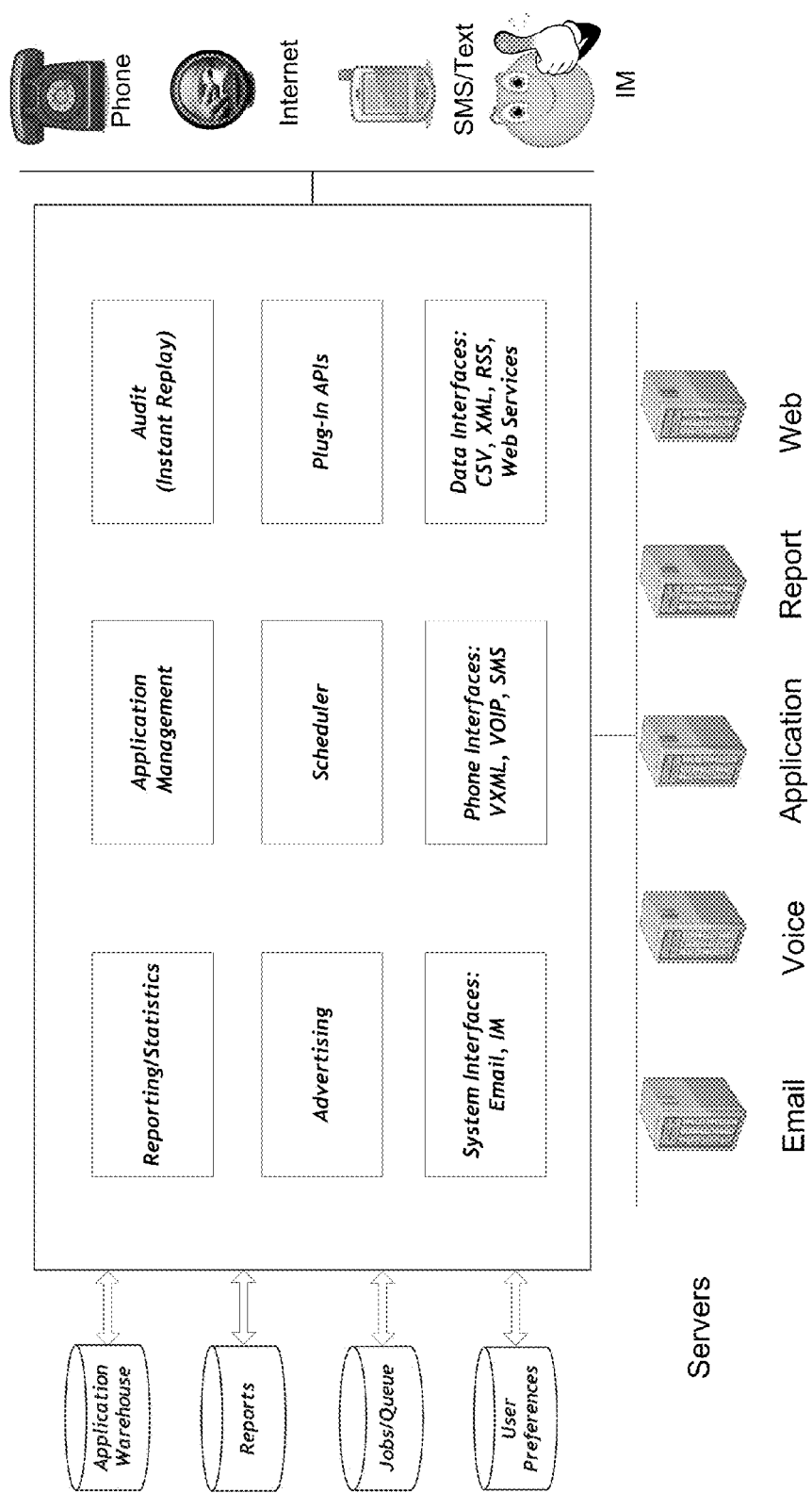
FIG. 6 depicts some embodiments of the communication systems with even more increased involvement by a user.

The platform can be customized for different categories of users. In some embodiments, the system can be configured as shown in FIG. 4 for minimal involvement by the user. In these embodiments, the platform has been configured to be operated as a managed service for the user so minimal components (and associated functions) of the platform are present. In other embodiments, the system can be configured as shown in FIG. 5 for more involvement by the user relative to the configuration FIG. 4. In the embodiments shown in FIG. 5, the platform has been configured to be operated as a semi-managed service for the user so that a moderate amount of the components (and associated functions) of the platform 10 are present. In yet other embodiments, the system can be configured as shown in FIG. 6 for maximum involvement by the user. In these embodiments, the platform has been configured to be operated as a self service for the user so the maximum number of components (and associated functions) of the platform are present.

The platform 10 can also increase the efficiency of communications between two or more users that use different devices or systems or that prefer different methods of communication. In many industries, especially the health care industry, there are multiple users that need to repeatedly and effectively communicate with each other. Examples of the users in the health care industry include insurance companies, medical offices, billing companies, collection agencies, and patients, as well as the customers and partners of these users. But when these entities communicate with each other, there are numerous inefficiencies because their preferred communication method may differ from each other. For example, a patient may prefer to communicate about an invoice using a wireless telephone whereas a doctor's office may instead prefer email communication. As well, there exist inefficiencies because their preferred communication device/system may differ from each other. For example, an insurance company may prefer to communicate about an invoice using a computing device operating a first billing software (like AllScripts or a customized billing system) whereas a doctor's office may instead use a second billing software (like Lytec).

These problems have traditionally been addressed using many different solutions. One solution has been to hire more personnel (i.e., agents) to handle the increased loads from the inefficient communication. Another solution has been to implement either a dialer (for outbound) or an IVR device for inbound (call center) calls. Yet another solution has been the increased use of internet-based services for claims-based communications. But none of these solutions have solved this communication inefficiency because there's currently not a solution that allows both companies to either automate or semi-automate their work while staying within their preferred methods.

The systems and methods described herein can overcome these inefficiencies by using the platform 10 to organize and manage the communication flow between the multiple users. The platform 10 can be used to partially or wholly automate the communication flow between the two (or more users/systems) by determining the desired communication mode (which includes the system/device, software, mechanism, and desired communication channel) of each user/system. Using that mode, the platform then organizes the communication flow between the users by matching each user's communication mode (including system/device, software, mechanism, and channel or other parameter) with the other user(s) so that every parameter of the communication (including time and resources needed for the communication) is optimized.

The platform 10 can determine the communication mode by finding all of the mode components (for instance, system/device, software, mechanism, schedule/availability, workflow, and channel) for each user in any order. The platform 10 can discover this information automatically or manually. In the automatic process, the platform 10 can interact with the user device 15 or system to find the hardware and software specifications of the user device 15 and the most often communication channel used by the device. An example of this interaction, a rules engine could be used to determine the communication mode. If an insurance company puts in the rules engine that the first contact should be their own home grown web service, depending on the return code the rules engine would define the next step/communication mode. For instance, if the web status is returned as paid or approved, the interaction could stop there. Otherwise, the interaction could go to the $2^{nd}$ communication mode, which could be the IVR. Subsequently, the rules engine could determine not only the communication mode but the specific path to take in that mode. For instance, if a workman's compensation claim is presented, the interaction can proceed through the IVR path 1, otherwise, it could go through IVR path 2 (or 3 or 4, etc.). Subsequently, another party such as a provider could enter in their preferences into the rules engine. For example, if a provider prefers the phone as a communication mechanism, in the first scenario, a claim can be uploaded from the provider, the platform would determine the payer preferred communication mode (web inquiry) and perform the web query, the status will be returned as approved, and the platform will reference the rules engine determined by the provider, identify that the preferred communication mode for the provider is the phone, call the provider and tell them the claim information with the status being approved. In a second scenario, a claim can be uploaded from the provider, the platform can perform a web query, and the status will be returned as rejected. In this second scenario, a call can be placed by the platform into the insurance company's IVR. The IVR tree and hold time is automatically navigated by the platform until an agent from the insurance company answers the call. At that time, the provider agent is called and both the agents are automatically provided with the claim information. When they are ready, they both will join a conference call to discuss the matter further. In the manual process, the platform 10 merely asks each user to supply the information about each of the mode components.

In some configurations, each user can configure or customize the mode components that will make up their desired communication mode. These configurations allow each user the ability to design their resources to receive and/or send the data and information they need for the most efficient handling within their operations. Sending and/or receiving the information via their customized mode will significantly streamline the communication process since they do not have to match their mode components (whether system/device, software, communication channel, or other parameter) with another user just to communicate with that user.

In some embodiments, the communication mode could include other desired parameters of the communication. The communication mode for a given user could include the types or categories of data/information to present, the order in which the data/information is to be presented, the tempo/timing of the data presentation (to fit the given user's needs), or combinations thereof. For example, a given user could want connectivity to other users immediately after data is presented to them or only after an agent for another user indicates they are ready with the desired information.

To illustrate this difference in preferred mode components, user A (which operates an insurance company) could have designed its operations to work most efficiently via voice channels whereas user B (which also operates a billing company) could have designed its operations to work most efficiently via web services. For user A, the most effective/efficient flow for their operations may be to simply present an identification claim for payment (a claim ID) to their agents via the phone in a slow and deliberate manner. As the agents are listening and typing, they might prefer a verification step as well as the ability to indicate when they are ready to talk to an agent from user B. Though the agents for user B may need the exact same information (ClaimID), they are much more efficient at receiving the payment information since they use a secure "screen pop" from their web operations. As such, the agents from user B can quickly copy and paste the ClaimID into their local system. Since there is little room for error in this copy/paste operation when the screen pop with the ClaimID appears, the agents for user B typically want to immediately enter a conference call and talk to the agent for user A.

After determining the desired communication mode, the platform 10 then organizes the communication flow between the users using the selected mode. In some embodiments, the communication mode of each user is coordinated with the other user's mode so that each user's communication is optimized.

There are several methods for coordinating the communication mode of the various users participating in the communication. In some embodiments, the modes can be coordinated by integrating the communication with the existing software that each user employs. As an example of these embodiments, a claim for payment for a doctor's services (a first user) is overdue from various patients (the other users) for many days. In such an instance, the platform 10 can interact with the software operating on the doctor's office network to determine which claims are overdue by 30 days (or 60, 90, or any other time period). The platform 10 can then try and contact the various patients by their chosen communication channel (i.e., email, telephone, etc.) to remind them of the payment due.

Figure 8:
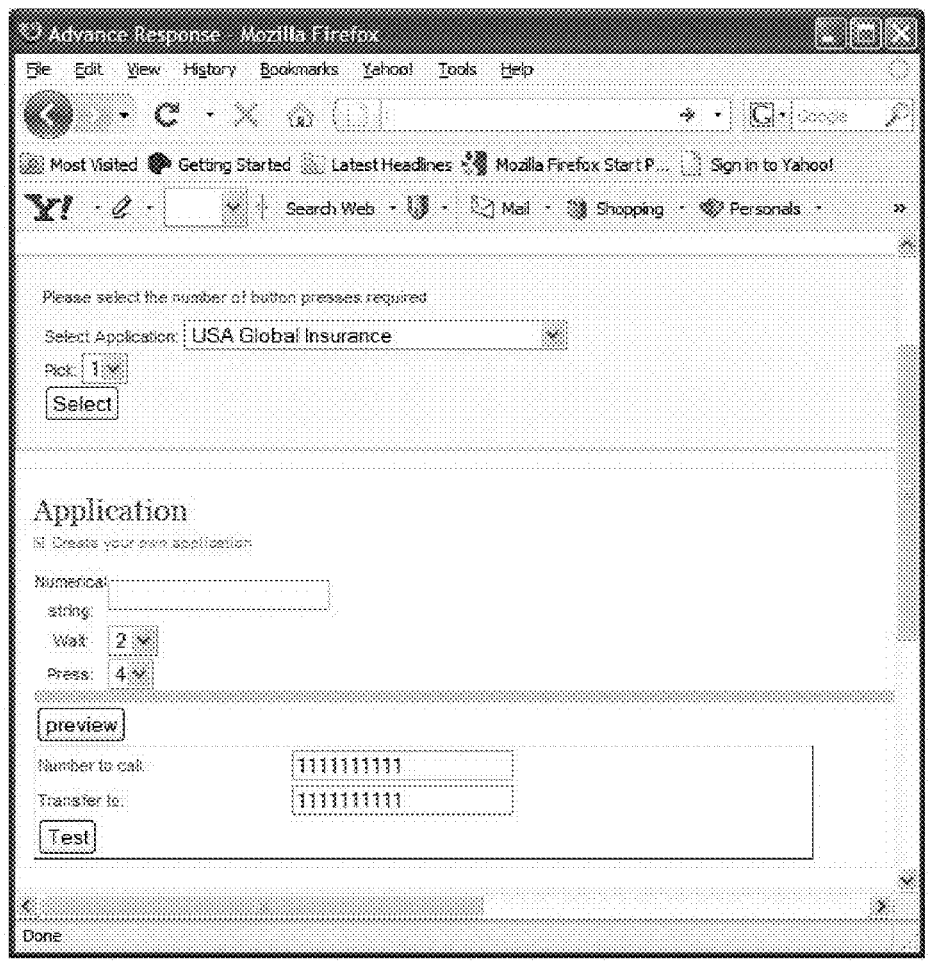
FIG. 8 shows some embodiments of a user interface that can be used in the communication systems.
Figure 9:
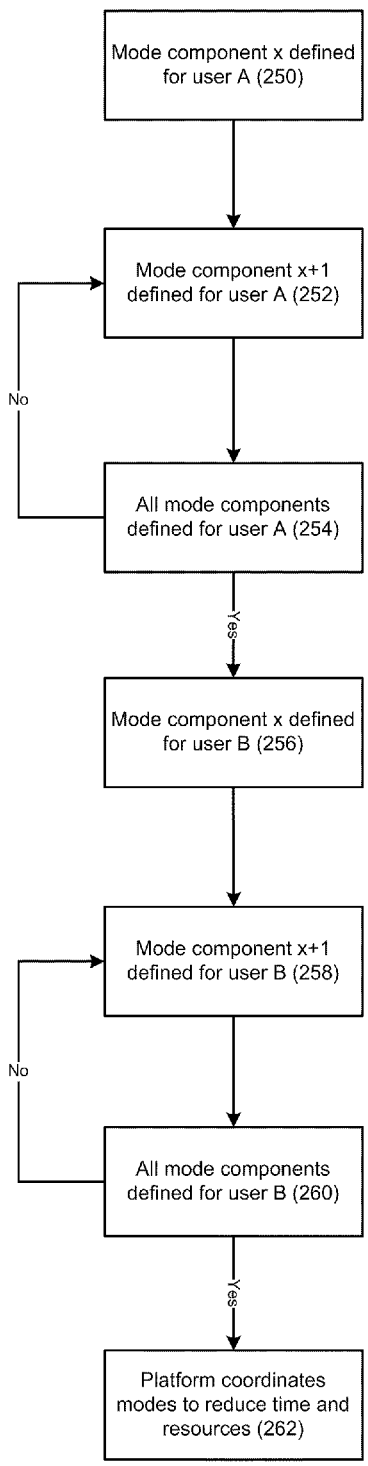
FIGS. 9-10 show some methods for communicating between multiple users.

In other embodiments, the communication modes can be coordinated between users by automated phone calls from the platform 10. In these embodiments, a first user can configuration the platform 10 to call a second user and navigate through the second user's system using IVR. Once the first user has automatically navigated through the second user's system to reach the desired part of that system, the platform 10 can be instructed to wait "on hold" until a desired point in time is reached. One point in time can be, for example, when the second user's agent starts to engage in the communication process, at which time the interactions between the first user and the second user can begin. An example of this coordination can be seen in the user interface depicted in FIG. 8. In FIG. 8, an initiating company (first user) can use the platform 10 to make an automated (or partially assisted) telephone call to a company called USA Global Insurance (the second user). When the call is made to USA Global Insurance's IVR, it can wait for that IVR to answer. Once it answers, the platform 10 can navigate Global Insurance's IVR. For instance, it can be instructed to wait the desired time period (i.e., 2 seconds) or listen for a specific phrase like "for claims, press 4", and then press the number 4 which will choose the desired option (i.e., go to the correct queue to wait to speak to a live claims person). Subsequently, it will automatically wait on hold until the recipient agent (of the second user) engages in the communication by answering the telephone.

In yet other embodiments, the communication modes can be coordinated between multiple users. For example, when a billing agent is calling an insurance company agent using the platform, when both agents are ready to hear the claim information, the platform can automatically call/screen pop the billing agent and present him with the appropriate information. In this manner, the communication is being coordinated between the 2 agents via the platform. When both agents are ready, they can be connected via mechanisms such as the phone, chat, or VOIP.

In some configurations, part of coordinating the communication modes of the users can include the process of resource synchronization. This process synchronizes the communication flow between the users so that the time and resources of each user's communication is minimized, including any manual input needed during the communication process. In these configurations, the communication typically occurs between agents in two or different users (each with their own systems and software) rather than just involving individual users communicating with a single device.

The goal of the resource synchronization process is to minimize the communication time and resources needed for each user, not just for a single user. In conventional communications, a first user (including its agents) would often navigate through a second user's system, only to be put on hold while waiting for a response from the second user (typically, the ability to speak with the agents of the second user). And even when both agents connected, not only is one agent generally still giving the other agent the information needed (like claim number, date of service, etc) to start the in depth conversation, often one of the agents was using a non-preferred communication mode (i.e., they were speaking by phone rather than using IM or email). With the resource synchronization process, though, both users (via their agents) can be engaged with each other at substantially the same time and use the preferred communication channel. Thus, as the recipient agents begins their engagement (i.e., listening to the claim ID, date of service, etc), the initiator's agents also start to be engaged (i.e., hearing the claim ID) at substantially the same time.

As an example of this resource synchronization for voice/phone communications between multiple users, neither user (or their agent) is engaged while the platform 10 is dialing, navigating each user's system through IVR, or waiting on hold. In the case of a billing company as one user and an insurance company as another discussing a payment claim, agents at both companies are doing work that is unrelated to that specific claim and are unaware that the platform 10 is performing these functions. When one of the agents is ready to be engaged in the payment process (for example, the insurance company agent), the other agent is automatically notified and optionally engaged in the payment process. Since both agents are then engaged in the payment process, they would be analyzing the data/information within their respective systems and preparing to communicate with the other agent. Once both agents are ready, they would be connected via mechanisms such as a phone transfer, a conference call, a chat session, etc. Further, multiple sets of information could be presented at one time. For instance, 5 or more claims could be presented via a screen pop, allowing both agents to be prepared for all claims before interacting with each other.

Thus, rather than the payment containing a sequential series of events, it contains a series of parallel events. In the conventional payment process, and without the platform 10, the biller's agent would have to look up the claim information and be ready to discuss the claim. At this point, they'll make the call, navigate the insurance company's IVR, wait on hold, then tell the insurance company's agent the needed data (i.e., provider number, claimID, date of service, etc.) and then wait while the insurance company's agent is ready to discuss the claim. All this occurs after the biller's agent is ready to discuss the claim. Thus, it is a sequential series of events where one of the agents prepares to communicate and then must wait while the other is notified and then prepares to communicate (and sometimes the second agent must wait since the first agent has moved onto other activities). With the platform 10, though, both agents are engaged in parallel with little to no time wasted on waiting or holding for the other agent.

Figure 7:
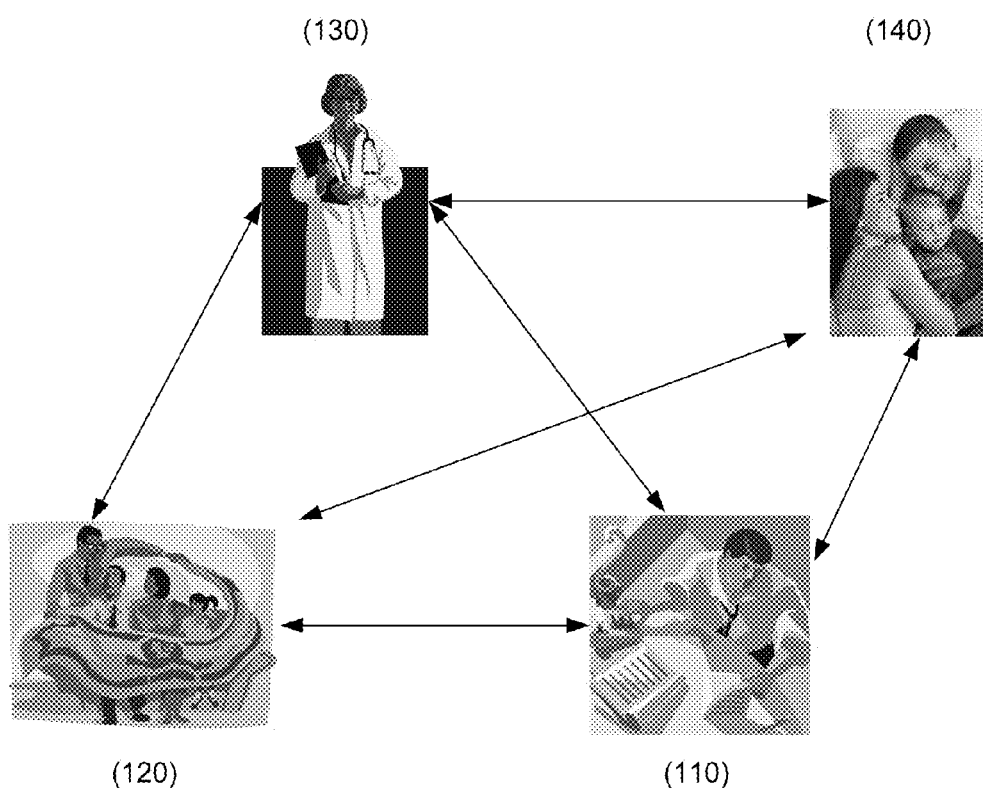
FIG. 7 depicts some embodiments of multiple users communicating with each other using the communication system.

Another example of this resource synchronization process can be illustrated by referring to FIG. 7. In this Figure, a first user (medical biller 110) needs to communicate about an unpaid claim with a second user (an insurance company 120). The platform 10 can be used to monitor the claim status via the insurance company's web services. If needed, the platform 10 can be configured using any payment parameter (including length of time before payment, amount of payment, agent availability [including when the biller agent is available and if they are available, he can start agent related transactions like phone calls], insurer [since some billers might call different insurance companies on different days]) so that when that parameter is met, the platform 10 can place an outbound telephone call on behalf of a third user (doctor's office 130) to the insurance company. The platform could then navigate the insurance company's system (using IVR) and then wait on hold until an agent from the insurance company is ready to be engaged. At that time, the platform 10 can provide synchronized screen pops to both the insurance company agent as well as the provider agent, giving both agents the information they need to look the claim up in their respective systems. If needed, while both agents are on the phone, the platform 10 could then contact either the doctor's office (i.e., to verify the services rendered) and/or the patient 140 (as a fourth user) to verify the payments already made. Once both agents are ready, they can either talk to each other via any desired communication channel (i.e., phone, voip, IM chat, etc.) in order to bring the claim to resolution. Thus, the communication is efficient, effective, reliable, and visible for all of the users involved.

In some embodiments, the platform 10 can therefore provide substantial real-time interactivity with any number of users. To obtain this real-time interactivity, all responses for instance voice, DTMF, instant message, SMS, email, etc. may be configured within the application on the application server to obtain information from the user (whether recipient or caller). For example, the platform 10 could be configured to collect any user input such as authentication, authorization, or confirmation when multiple users are interacting in substantial real-time.

In come embodiments, the platform 10 can be customized for each user. In some configurations, the platform 10 can be customized to create an application template that is specific to the needs of that user (or group of users). The template(s) can be created using the configuration engine 85. The applications may be created in one or more of the following methods. First, by entering text, such as through a web interface, and then the entered text can be played over the phone using the speech engine. Second, the applications can be by submitting content via email, ftp, or other API method. For example, the submitted content may comprise pre-recorded content (audio files, advertisements) or existing text content (such as from email services, news services, RSS feeds, etc.) about any desired topic. Third, an application can be created by recording prompts and/or questions through a web interface or over the phone. Recording desired content over the phone can involve either an inbound or an outbound process. In an inbound process, an individual user can call into a specified phone number, subsequently record desired content over the phone, and optionally follow a series of prompts which guides the caller through the various parts of the template. In an outbound process, an individual user can enter a phone number, such as through a web interface. This action can then trigger a call back to the user who can then record the desired content over the phone, optionally followed by a series of prompts which guide the caller through the various parts of the template. Fourth, an application can be created by uploading prerecorded content that includes, for example, audio files, video files, etc.

Using the platform 10, a variety of data can be collected. The data can be analyzed and reported/used for a variety of purposes such as analytics. First, as noted above, the data can be used for the platform 10 to determine the desired communication mode, coordinate the communication modes, and synchronize resources between multiple users, as described above.

Second, the data can be used to improve user relationships, as known in the art, and thereby maintain and create lasting relationships with users. The ability to monitor user transactions allows determination of common trouble spots in the user interaction with the system, including interactions with the platform or components thereof. With this information, the system can remove or change the trouble spots and make the system and platform more user friendly. Also, by receiving and being able to monitor large amounts of detailed feedback from earlier analysis, the system may be better equipped to make decisions that reflect the wants and needs of users.

Third, the collected data can be used to enhance and/or customize the operation of the system and/or the platform. For example, a system administrator could monitor fault and performance data to identify factors that slow transactions or communication. In other aspects, the collected data can be used to enhance the transfer of the content. In yet other aspects the collected data could be used to assess areas of improvement for user's own processes. For instance, for claims collection, the platform will be able to determine things like which types of claims come in and which agents resolve the claims in what time frames (and assessing possible areas of training). Another example in claims collection is length of resolution times for providers. In this case, if a provider is consistently way above expected time frames, training or other action may result.

Fourth, the collected data may be shared with third parties (including non-users) that are not part of the transaction. The collected data may be shared using a variety of techniques, including actively communicating to third parties using, for example, e-mail, EDI, DEX/UCS, or by uploading the data to a separate computer controlled by the third party. The collected data can be reported to or monitored by the third parties by either transmitting it to the third parties or by allowing the third parties to access the platform 10, either directly or indirectly through the web portal. In the former situation, the collected data may be optionally collated, analyzed, summarized, or otherwise processed using a variety of steps. This situation allows the operator of the system to perform the analysis, filter the results, and/or customize the report that is sent to the third party. In the latter situation, the third party can monitor the collected data before (or as) it is received from the user devices or anytime during the analysis, filtering, or customization process. Of course, access to the platform by the third party can be established using any parameters desired by the operator of the system, i.e., access to only certain portions of the collected data.

Alternatively, the collected data need not be transmitted to the platform before being monitored by or reported to third parties. In these aspects of the systems, the data can be monitored by transmitting it to the third parties from the user device(s). This situation gives the third party more access to the raw data that has been collected, but does not necessarily allow the operator of the system to analyze, filter, or customize the report. Of course, access by the third party can be established using any parameters desired by the operator of the system, i.e., access to only certain portions of the collected data. Fifth, the collected data can be used for auditing purposes.

The platform 10 can also issue any type or number of reports to the user(s), the operator of the platform 10, and even third parties. One report that can be issued comprises a resolution report. The resolution report can be used by the users to determine the parameters of the resolutions of all of the transactions over which they have been communicating about. For example, the resolution reports could include information about which users had transactions that were more statically resolved than other users, the percentage of transactions that were actually resolved, which types of transactions were statistically resolved (and which were not), the time (both in calendar time and allocated resources) needed to resolved a transaction, the number (or average) of interactions with a particular user (or category of user) that were needed to resolve a transaction, the specific agents of a user that were more successful at resolving transactions, which transactions were easier to resolve than others, which transactions could be partially resolved, which vendors take longer or shorter to resolve certain transactions, etc. As an example, if a biller takes 5 times longer to resolve a type of claim than all other billers, this information could be reported. Further, insurance companies could set limits on which billers are allowed to contact them via what mechanisms.

Another report that can be issued by the platform 10 is an audit report. The platform 10 can record details about every communication and then store/archive those details. In some embodiments, the platform 10 can record activities like which communications were attempted, when they were attempted, the users involved, the details of the communication flow, and the end result of the communication. For example, each transaction (i.e. call placed) can be implemented as either a static or dynamic application. Depending on the desires of the user, if the static application is chosen, the source code for each communication can be saved and stored for future reference. In some instances, when a transaction starts and a telephone call is placed to a specific user, a unique application will be generated. That application (html, vxml, or other) can be used for the actual communication with that particular user. The communication itself (i.e. 2 agents talking) can be recorded, if desired, and the application source code, end status, and any other possible data points can be archived for any desired purposed, including any customer or government audit.

Other reports include interaction durations, agent efficiency and company/entity efficiency in handling various claims calls, as well as customer satisfaction surveys. These and other reports can cross-reference data to provide even new reports. Examples of these new reports are overall volume, number of attempts, effort level, and end result of a particular type of claim across the industry. For instance, one insurance provider may process 20% of all of the transaction volume for a particular type of claim. While processing these claims, the average provider attempts could be 4 with an average duration of 3 minutes while achieving a 70% successful resolution rate. Conversely, another insurance company may process 10% of the total volume of the same type of claim. In this case, they may be successfully resolving 80% of the claims with only 1 attempt per provider at an average 2 minutes.

The systems described above can be used to perform a variety of methods. One of the methods, as described above, involves determining the preferred communication mode and then coordinating the communication mode between multiple users. One example of this method is depicted in reference to FIG. 9. This exemplary method begins in block 250 when the first communication mode component (x) is determined for user A either by the user A selecting that mode component or the platform 10 determines that component (x) as described above. The method continues, as shown in block 252, when the second communication mode component (x+1) is determined for user A either by the user A selecting that mode component or the platform 10 determines that component (x+1) as described above. At block 254, the platform 10 determines whether all of the communication modes have been determined. If not, the method returns to block 252 where additional modes are determined. This loop continues until all modes have been determined, at which point the method proceeds to block 256.

In block 256, the first communication mode component (x) is determined for user B either by the user B selecting that mode component or the platform 10 determines that component (x) as described above. The method continues, as shown in block 258, when the second communication mode component (x+1) is determined for user B either by the user B selecting that mode component or the platform 10 determines that component (x+1) as described above. At block 260, the platform 10 determines whether all of the communication modes have been determined for user B. If not, the method returns to block 258 where additional modes are determined. This loop continues until all modes have been determined, at which point the method proceeds to block 262. At block 262, the platform 10 begins the communication between user A and user B by coordinating the modes for each user.

A similar method involves controlling the communication flow between users by using the platform. All aspects of the communication flow can be controlled, including controlling the times of day for transfers, the communication channel, the upload and download bandwidth of a user device, and the content available for transfer. In some configurations, this information about the communication flow can be communicated to users desiring to enter into a transaction because this will allow the users to optimize the communication mode they respectively use internally within their systems.

The system can also be used to collect data from the user's device, whether individually or collectively. Any data or information can be collected when it is transferred from the user's device 15 to the platform 10. The collected data can include financial data. Examples of the types of financial data include payment information, sales information, credit/debit/gift card information, accounting information, other electronic payment information (for instance PayPal) and so forth. As a user's device can be a system, any type of data can be collected (as long as the appropriate mechanisms and authentication are provided). For instance, for claims collection, the platform 10 can gather information about the status of a claim from an insurance company's system. Examples of other types of data include checking account information and demographic data. The data can be transferred on a periodic basis, on a semi-dynamic basis, or on a real-time basis. This information about the user devices, whether individual or collective, can be communicated to users desiring to enter into a transaction because this will allow the users to optimize the communication mode they respectively use.

Other methods allow the operator of the platform to configure and customize information presented to a user. In some embodiments, the platform can be used to analyze or manipulate the information for any number of purposes, especially in the context of the information presented to multiple users during a transaction. For instance, the platform 10 could be used to collected the data from a first user in a first format (consistent with the first user's communication mode) and then manipulate/change that information into a second format for the second users (consistent with the second user's communication mode).

In some embodiments, certain notification actions, including actions that are taken on a proactive basis, can be sent to the user(s). The need for this type of communication revolves around the need to proactively notify account owners of events that may require action, such as authorizing pending transactions, transferring funds from one account to another, making a payment, soccer practice being changed to a different time, etc. The following account events could trigger notification: account balance thresholds; transaction verification of pending or completed transactions, especially those that may exceed a given amount; password change/reset; credit card transaction; account upgrade changes; complaints; payment failure; negative balance/overdraft; other events related to financial account activity; fund transfers; balances coming due; etc. The action can be used to notify users of information, such as account information other events, including—but not limited to—pending or completed transactions, balances, and available funds, appointment reminders, medication reminders, severe weather notices, school closures, a change in game/practice schedule, etc. Notification may be conducted via any communication channel, whether that channel is part of the selected communication mode for a user. In some embodiments, the notification can include a notice that a transaction is desired between multiple users.

The notification action can be based on the profile of the user. In these embodiments, the account owner can determine the desired communication mode by specifying the preferred method(s) of contact, across phone, email, IM, other social networking mechanisms (such as Twitter), text or other mechanism, preferred time of contact by time of day or day of week, the type of data or information that could be received by any specific user device, or any another communication mode component. In other embodiments, the notification can be based on the profile of a transaction.

Figure 10:
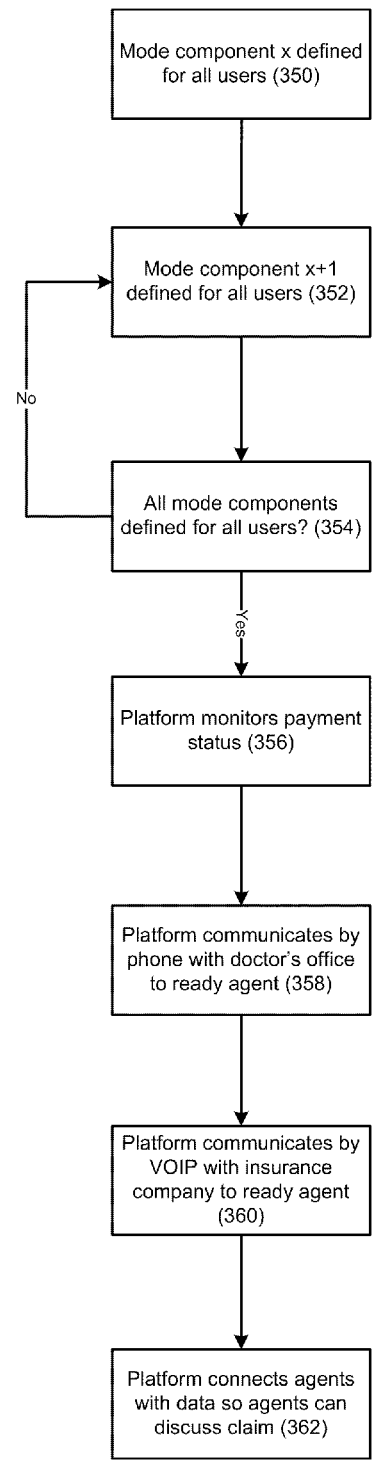

In one particular example of the systems and methods described, a transaction can be initiated between any number of users, as shown in FIG. 10. In this transaction, a medical billing company (user A) needs to communicate about an unpaid claim for $1001.00 with both an insurance company (user B) who will initially pay for most of the medical services that have been billed from a doctor's office (user C) and also a patient (user D) who will be responsible for paying for the remainder of the amount. Each of these four users can create their preferred communication mode components, as shown in blocks 350, 352, and 354. For example, the patient could define that her communication mode be limited to text messages that she receives on her cellular telephone, the communication mode of the doctor's office could be limited to phone calls received between the hours of 8 am to noon, the communication mode of the billing company could be defined to be IM during business hours, and the communication mode of the insurance company could be defined as VOIP communication received through the web at any time during the day.

The platform 10 could then monitor the payment status, as shown in block 356, by periodically checking with the insurance company's web services, the IM traffic of the billing company, the emails received by the doctor's office, and/or the text messages received/sent from the patient's phone. The platform 10 can be configured to check the status using any payment parameter (i.e., claimID, amount of payment, question about the amount, etc.). The platform could then be configured to take any number of actions depending on the information retrieved from the monitoring. For example, as shown in block 358, if the monitoring reveals that the insurance company has a question about the services rendered, the platform could call the doctor's office, navigate through the telephone options until the agent for the doctor's office is available and then asking that agent to be available to interact with the insurance company. Once the agent agrees, the phone call from platform 10 could be put on hold while the platform 10 contacts the insurance company via VOIP to speak with an insurance agent, as shown in block 360. Once that agent is available, he is connected to the doctor's agent who has been working on a different project. If needed, both agents could be put on hold until a time when they are both ready to discuss this particular transaction. Then, as shown in block 362, the platform 10 connects both agents and can provide synchronized screen pops to both the insurance company agent as well as the doctor's office agent, giving both agents the information they need to look the claim up in their respective systems.

During the discussion between these two agents, a question might arise about whether the patient actually received the services billed by the doctor's office. In that event, both the insurance agent and the doctor's agent could be put on hold while the patient is contacted, allowing both agents to turn to other transactions. The platform 10 could then send one of a number of types of messages the patient. For instance, a phone message/interactive application, a text message, email message, or IM/Chat/Social Networking message to the patient. Once a return message is received, the platform could re-connect the doctor's agent and the insurance company agent. If needed, both agents could be put on hold until a time when they are both ready to re-discuss this particular transaction, at which time the platform 10 connects them and can provide synchronized screen pops to both the insurance company agent as well as the doctor's office agent with the information from the patient. The system can also process actual payments, say from patients.

During the transaction, the platform 10 could ask any of the users if they would accept communications outside their preferred mode and/or automatically allow them that functionality. For instance, if the patient in the example immediately above determined that a text message could not provide the information requested, the patient could be given the option (whether automatically or by being asked) of whether she would like to reply by participating in a phone conference.

The methods and systems described above have several features that are very useful. The users can save time and increase accuracy, scalability, and visibility while reducing cost and frustration during their communications. The users can also be provided with reports detailing possible areas of improvement for further operational gains and/or cost savings. The system can also provide a helpful link between users that are companies. As the health care industry changes to a more technologically advanced infrastructure, the system can bridge the technological gaps created as one company moves forward and another does not, such as where a doctor's office does not currently use web services while an insurance company does. This system can integrate with the doctor's office's current software to automatically schedule web service interactions and update the doctor's office software with the insurance company's responses. This situation can encourage greater acceptance of emerging technologies and reduce the need for the doctor's office to, for example, call the insurance company to get the latest status. Another useful feature includes integrating with the doctor's office software to place appointment confirmation calls, emails, etc.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A communication method, comprising:
   providing a communications platform capable of handling multiple types of communications with multiple users, comprising:

a browser for a communications network, the browser configured to interact with and organize information about the multiple communication types and the multiple users;

a server for handling communications between the platform and user devices that are external to the platform;

a database configured to store user data comprising a preferred communication mode and contact protocol for a given user;

a speech engine for converting text to speech, for converting speech to text, or both;

a mining engine configured to analyze the communication data flowing through and present in the platform; and a network interface;

connecting a communications network to the network interface of the communications platform;

using the browser to provide an interface between the communication platform and the communications network, the interface configured for the platform to interact with various types of user devices and communication modes;

connecting first and second user devices from first user and second users to the communications network at the same time using each users' preferred contact protocol;

determining a communication mode for the first user and the second user based on the user data in the database, wherein the first user employs a first communication mode with first mode components and the second user employs a second communication mode with second mode components that is different than the first communication mode;

allowing the first and second users to communicate with each other in parallel using the platform and each user's respective communication mode while each user is connected to the communications network;

synchronizing the communication between the first user and the second user by matching the mode components from the first communication mode to the mode components of the second communication mode to minimize the time needed by both the first and second user for the communication; and using the mining engine to optimize operation of the platform.

2. The method of claim 1, wherein the communication mode is determined by the platform.

3. The method of claim 1, wherein the communication mode is determined by the user.

4. The method of claim 1, wherein the mode components include the type of user device, the software operating on the user device, and the communication channel for the user and wherein the communication mode is determined using these three mode components.

5. The method of claim 4, wherein the communication channel comprises phone communication, VOIP, email, chat, text messaging, SMS, social networking, instant messaging, internet communication, voice mail, answering machines, video communication, APIs, web pages, web services, or a combination thereof.

6. The method of claim 4, wherein the type of user device comprises a desktop computer, a laptop computer, a server, a telephone, a mobile or cellular phone, a personal digital assistant (such as a Palm Pilot, iPaq, Blackberry device), an automated calling system, any known interactive voice response device, an answering machine, a portable electronic device, a mobile hand held device, any electronic device containing computing software or an application programming interface, or any combinations thereof.

7. The method of claim 1, further comprising using the platform to collect data from the first user device and the second user device, the collected data including financial data about the first and second users.

8. The method of claim 1, further comprising allowing the first or second user to customize the mode components in the first or second communication mode.

9. A communication method, comprising:
providing a communications platform capable of handling multiple types of communications with multiple users, comprising:

a browser for a communications network, the browser configured to interact with and organize information about the multiple communication types and the multiple users;

a server for handling communications between the platform and user devices that are external to the platform;

a database configured to store user data comprising a preferred communication mode and contact protocol for a given user;

a mining engine configured to analyze the communication data flowing through and present in the platform;

a speech engine for converting text to speech, for converting speech to text, or both; and a network interface;

connecting a communications network to the network interface of the communications platform;

user the browser to provide an interface between the communication platform and the communications network, the interface configured for the platform to interact with various types of user devices and communication modes;

connecting first and second user devices from first and second users to the communications network at the same time using each user's preferred contact protocol;

determining a communication mode for the first user and the second user based on the user data in the database, wherein the first user employs a first communication mode with first mode components and the second user employs a second communication mode with second mode components different than the first communication mode;

allowing the first user to communicate using a first communication mode while at substantially the same time allowing the second user to communicate using a second communication mode; and synchronizing the communication between the first user and the second user by matching the mode components from the first communication mode to the mode components of the second communication mode to minimize the time needed by both the first and second user for the communication; and using the mining engine to optimize operation of the platform.

10. The method of claim 9, wherein each communication mode is determined by the platform.

11. The method of claim 9, wherein each communication mode is determined by each user.

12. The method of claim 9, wherein the mode components include the type of user device, the software operating on the user device, and the communication channel for the user and wherein the communication mode is determined using these three mode components.

13. The method of claim 12, wherein each communication channel comprises phone communication, VOIP, email, chat, text messaging, SMS, or instant messaging, internet communication, voice mail, answering machines, video communication, APIs, web pages, web services, or a combination thereof.

14. The method of claim 12, wherein the type of user device comprises a desktop computer, a laptop computer, a server, a telephone, a mobile or cellular phone, a personal digital assistant (such as a Palm Pilot, iPaq, Blackberry device), an automated calling system, any known interactive voice response device, an answering machine, a portable electronic device, a mobile hand held device, any electronic device containing computing software or an application programming interface, or any combinations thereof.

15. The method of claim 9, further comprising using the platform to collect data from the first user device and the second user device, the collected data including financial data about the first and second users.

16. The method of claim 15, wherein the communication between multiple users transpires in parallel.

17. The method of claim 9, further comprising allowing the first or second user to customize the mode components in the first or second communication mode.

18. A communication method, comprising:
providing a communications platform capable of handling multiple types of communications with multiple users through a network interface;
connecting a communications network to the network interface of the communications platform;
providing an interface between the communication platform and the communications network, the interface configured for the platform to interact with various types of user devices and communication modes;
connecting first and second user devices from first and second users to the communications network at substantially the same time;
determining a communication mode for a first user, wherein the first user employs a first communication mode with first mode components;
determining a communication mode for a second user, wherein the second user employs a second communication mode with second mode components different than the first communication mode;
allowing the first user to communicate using the first communication mode while at the same time allowing the second user to communicate using a second communication mode;
synchronizing the communication between the first user and the second user by matching the mode components from the first communication mode to the mode components of the second communication mode to minimize the time needed by both the first and second user for the communication; and
using the platform to collect data from the first user device and the second user device, the collected data including the first or second mode components; and
using the platform to monitor the collected data to identify factors that slow the communication.

19. The method of claim 18, wherein the first and second communication modes are determined by the platform, by each user, or by a combination thereof.

20. The method of claim 18, wherein the mode components include the type of user device, the software operating on the user device, and the communication channel for the user and wherein the communication mode is determined using these three mode components.

21. The method of claim 18, further comprising correcting the factors to speed up the communication between the first and second user.

22. The method of claim 21, wherein the communication between multiple users transpires in parallel.

23. The method of claim 18, wherein the collected data that is monitored comprises fault and performance data.

\* \* \* \* \*